United States Patent [19]

Donohue

[11] Patent Number: 4,577,609

[45] Date of Patent: Mar. 25, 1986

[54] CD IGNITION SYSTEM WITH SPARK RETARD IN NEUTRAL

[75] Inventor: James A. Donohue, Pewaukee, Wis.

[73] Assignee: Outboard Marine Corporation, Waukegan, Ill.

[21] Appl. No.: 679,576

[22] Filed: Dec. 7, 1984

[51] Int. Cl.[4] ............................................. F02P 3/00
[52] U.S. Cl. .................................. 123/602; 123/427; 123/620
[58] Field of Search ............... 123/406, 415, 418, 427, 123/602, 605, 596, 149 L, 597, 620

[56] References Cited

U.S. PATENT DOCUMENTS

| | | | |
|---|---|---|---|
| 4,133,325 | 1/1979 | West | 123/427 |
| 4,184,467 | 1/1980 | Kato et al. | 123/602 |
| 4,273,093 | 6/1981 | Ozawa | 123/602 |
| 4,391,236 | 7/1983 | Anderson | 123/149 C |
| 4,399,801 | 8/1983 | Kondo et al. | 123/602 |
| 4,412,522 | 11/1983 | Fujimoto | 123/602 |
| 4,413,608 | 11/1983 | Beeghley | 123/602 |
| 4,441,478 | 4/1984 | Fujimoto | 123/602 |
| 4,444,171 | 4/1984 | Baxter | 123/427 |
| 4,480,624 | 11/1984 | Anderson | 123/602 |
| 4,516,554 | 5/1985 | Miura et al. | 123/427 |

FOREIGN PATENT DOCUMENTS

| | | | |
|---|---|---|---|
| 9771 | 4/1980 | European Pat. Off. | 123/427 |
| 119965 | 9/1980 | Japan | 123/427 |
| 132464 | 10/1981 | Japan | 123/427 |

*Primary Examiner*—Raymond A. Nelli
*Attorney, Agent, or Firm*—Michael, Best & Friedrich

[57] ABSTRACT

A capacitor discharge ignition circuit adapted for use with an internal combustion engine, the circuit comprising a charge capacitor, a primary ignition coil, an ignition SCR, a first spark retard circuit in series with the charge capacitor, the ignition SCR, and the primary coil and operative for selectively preventing discharge of the capacitor through the primary coil for a first predetermined period of time after the ignition SCR is rendered conductive, thereby providing for automatic spark retard at higher engine rpm, a second spark retard circuit connectable to the first spark retard circuit for further preventing discharge of the capacitor through the primary coil for a second predetermined period of time in addition to the first predetermined period of time after the ignition SCR is rendered conductive, and a switch connecting the second spark retard circuit to the first spark retard circuit when the engine is in neutral.

25 Claims, 2 Drawing Figures

CD IGNITION SYSTEM WITH SPARK RETARD IN NEUTRAL

BACKGROUND OF THE INVENTION

The invention relates to capacitor discharge ignition systems and, more particularly, to CD ignition systems with circuits providing automatic spark retard at higher engine rpm.

Attention is directed to Anderson U.S. Pat. No. 4,391,236, issued July 5, 1983, which discloses a CD ignition system including a spark retard circuit providing automatic spark retard at higher engine rpm.

Attention is also directed to Anderson U.S. Pat. No. 4,480,624 issued Nov. 6, 1984, which discloses a CD ignition system similar to the system of U.S. Pat. No. 4,391,236 and further including means for advancing the spark timing at preselected engine speeds.

SUMMARY OF THE INVENTION

The invention provides a capacitor discharge ignition circuit adapted for use with an internal combustion engine, the circuit comprising a charge capacitor, a primary ignition coil, an ignition SCR, first spark regard circuit means in series with the charge capacitor, the ignition SCR, and the primary coil and operative for selectively preventing discharge of the capacitor through the primary coil for a first predetermined period of time after the ignition SCR is rendered conductive, thereby providing for automatic spark retard at higher engine rpm, second spark retard circuit means connectable to the first spark retard circuit means for further preventing discharge of the capacitor through the primary coil for a second predetermined period of time in addition to the first predetermined period of time after the ignition SCR is rendered conductive, and means for connecting the second spark retard circuit means to the first spark retard circuit means when the engine is in neutral.

In one embodiment, the first spark retard circuit means includes a second SCR connected in series with the charge capacitor, the primary coil, and the ignition SCR, and delay means for preventing the second SCR from being rendered conductive for the first predetermined period of time after the ignition SCR is rendered conductive.

In one embodiment, the second SCR has a gate, an anode, and a cathode, and the delay means includes an RC delay network including a capacitor and a resistor with a junction therebetween, the network having one end connected to the second SCR anode and an opposite end connected to the second SCR cathode, the delay means also including voltage threshold means connected between the second SCR gate and the RC delay network junction for preventing the second SCR from being rendered conductive for the first predetermined period of time after the ignition SCR is rendered conductive.

In one embodiment, the voltage threshold means comprises a zener diode having an anode connected to the second SCR gate, and a cathode connected to the RC delay network junction.

In one embodiment, the delay means further includes unilateral current flow means connected between the second SCR anode and the RC delay network junction to allow for discharge of the delay network capacitor through the unilateral current flow means when the second SCR is rendered conductive.

In one embodiment, the unilateral current flow means comprises a diode having an anode connected to the RC delay network junction, and a cathode connected to the second SCR anode.

In one embodiment, the second spark retard circuit means includes a second RC delay network connectable to the second SCR for further preventing the second SCR from being rendered conductive for the second predetermined period of time in addition to the first predetermined period of time after the ignition SCR is rendered conductive.

In one embodiment, the second RC delay network includes a capacitor and a resistor with a junction therebetween, the second network having one end connectable to the second SCR anode and an opposite end connectable to the second SCR cathode, and the second network junction being connected to the first network junction.

In one embodiment, the connecting means includes switch means for connecting the one end of the second network to the second SCR anode when the engine is in neutral, and for simultaneously connecting the opposite end of the second network to the second SCR cathode when the engine is in neutral.

In one embodiment, the switch means includes a switch connected between the one end of the second network and the second SCR anode, and between the opposite end of the second network and the second SCR cathode, and the connecting means further includes means for closing the switch when the engine is in neutral.

The invention also provides a capacitor discharge ignition circuit adapted for use with an internal combustion engine, the circuit comprising a charge capacitor, a primary ignition coil, an ignition SCR, first spark retard circuit means including a second SCR connected in series with the charge capacitor, the primary coil, and the ignition SCR, the second SCR having a gate, an anode, and a cathode, an RC delay network including a capacitor and a resistor with a junction therebetween, the network having one end connected to the second SCR anode and an opposite end connected to the second SCR cathode, and voltage threshold means connected between the second SCR gate and the RC delay network junction for preventing the second SCR from being rendered conductive for a first predetermined period of time after the ignition SCR is rendered conductive, means connected to the second SCR gate in parallel with the voltage threshold means and responsive to engine speed for applying a trigger voltage to the second SCR gate to render conductive the second SCR so as to advance the spark timing at a predetermined engine speed, second spark retard circuit means connectable to the first spark retard circuit means for further preventing the second SCR from being rendered conductive for a second predetermined period of time in addition to the first predetermined period of time after the ignition SCR is rendered conductive, and means for connecting the second spark retard circuit means to the first spark retard circuit means when the engine is in neutral.

In one embodiment, the circuit further comprises means for charging the charge capacitor, and the means for applying a trigger voltage to the second SCR gate includes a frequency to voltage converter connected to the second SCR gate in parallel with the voltage threshold means, connected to the means for charging the charge capacitor, and responsive to pulses representative of engine speed for applying a trigger voltage to the second SCR gate to render conductive the second SCR at the predetermined engine speed, thereby bypassing the RC delay network so as to advance the spark timing.

A principal feature of the invention is the provision of second spark retard circuit means connectable to the first spark retard circuit means for further preventing discharge of the capacitor through the primary coil for a second predetermined period of time in addition to the first predetermined period of time after the ignition SCR is rendered conductive.

Another principal feature of the invention is that the system functions as an idle governor. As can be readily appreciated by those skilled in the art, delay of charge capacitor discharge for a constant predetermined period of time results in increasing spark retard as engine speed increased. Thus, when the engine is idling, an increase in engine speed retards the spark timing, thereby lowering the power output of the engine and lowering the engine speed or rpm. If the engine speed decreases, the spark timing advances, thereby increasing the power output of the engine and increasing the engine speed or rpm.

Other features and advantages of the invention will become apparent to those skilled in the art upon review of the following detailed description, claims, and drawings.

Figure 2:
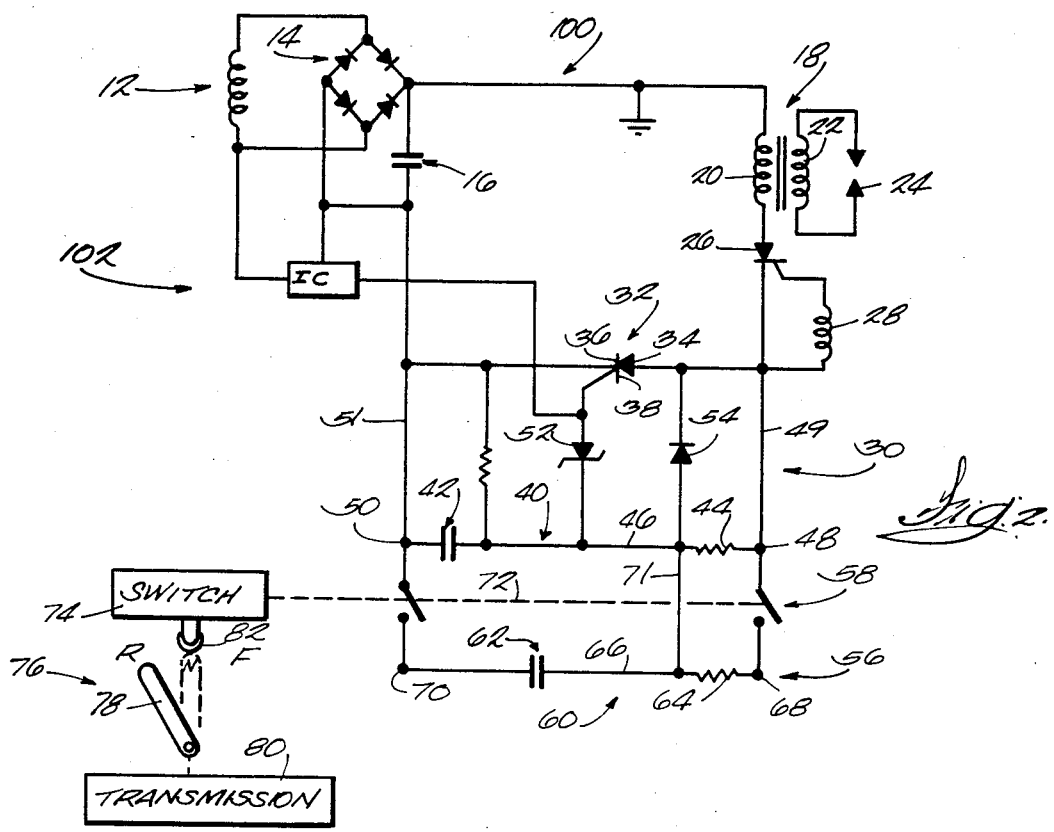
FIG. 2 is a schematic circuit of a capacitor discharge ignition system which is an alternative embodiment of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 1:
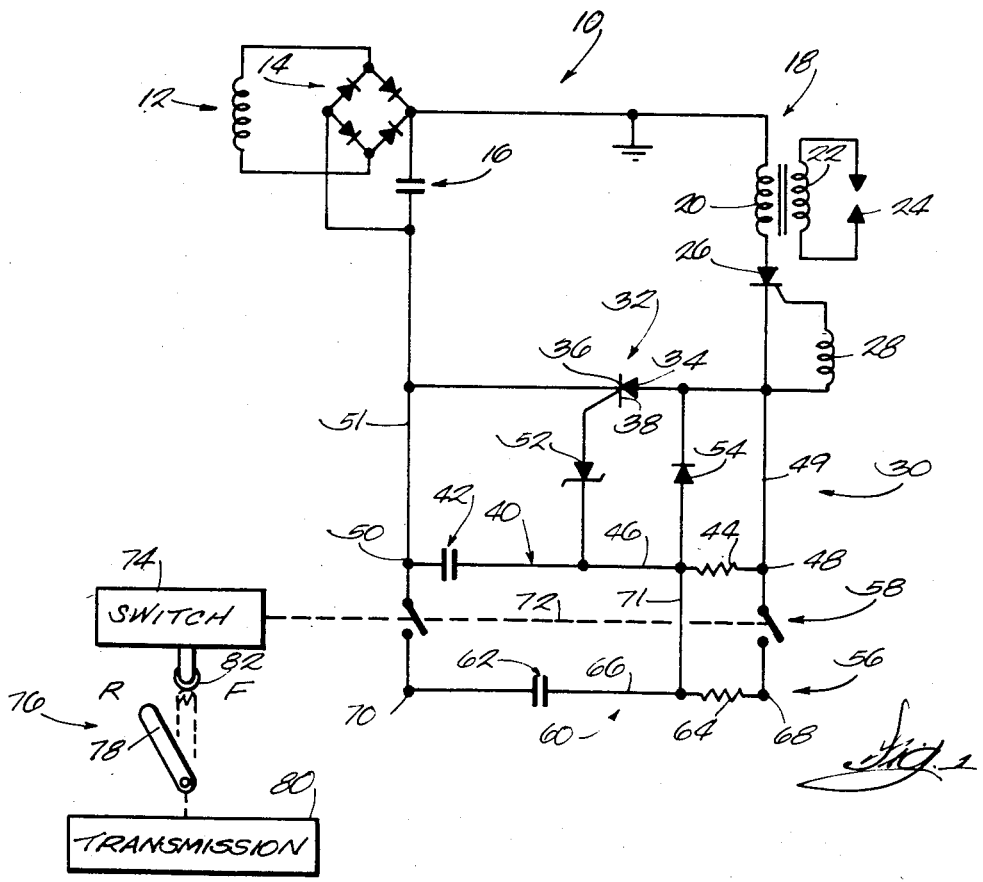
FIG. 1 is a schematic circuit of a capacitor discharge ignition system emboyding the invention.

A capacitor discharge ignition system 10 embodying the invention is illustrated in FIG. 1. The system is adapted for use with an internal combustion engine (not shown). The system 10 includes a power supply 12 having a full wave rectifying diode bridge 14 which is connected to a charge capacitor 16 for charging thereof. The system 10 also includes an ignition coil 18 including a primary coil 20, and a secondary coil 22 which causes an ignition spark across the contact of a spark plug 24 when charge capacitor 16 discharges through primary coil 20. The discharge of charge capacitor 16 is controlled by an ignition SCR 26 which is rendered conductive upon application of a trigger pulse to the gate of ignition SCR 26 by a trigger coil 28. The trigger coil 28 may be mounted on a trigger plate (not shown) which is movable by a conventional throttle linkage (not shown) to allow for adjustment of the ignition timing. The preceding components of the CD ignition system 10 are generally conventional.

The CD ignition system 10 also includes first spark retard circuit means 30 connected in series with charge capacitor 16, ignition SCR 26, and primary coil 20. The first spark retard circuit means 30 is operative for selectively preventing discharge of charge capacitor 16 through primary coil 20 for a first predetermined period of time after ignition SCR 26 is rendered conductive, thereby providing for automatic spark retard at higher engine rpm.

While various suitable first spark retard circuit means 30 can be employed, in the preferred embodiment, such means includes a second SCR 32 connected in series with charge capacitor 16, primary coil 20, and ignition SCR 26. SCR 32 has an anode 34, a cathode 36, and a gate 38, and the first spark retard circuit means 30 also includes an RC delay network 40 including a capacitor 42 and a resistor 44 with a junction or line 46 therebetween. The RC delay network 40 has one end 48 connected by line 49 to SCR anode 34, and an opposite end 50 connected by line 51 to SCR cathode 36. The first spark retard circuit means 30 also includes voltage threshold means, preferably in the form of a zener diode 52, connected between the gate 38 of SCR 32 and the RC delay network junction 46 for preventing SCR 32 from being rendered conductive for the first predetermined period of time after ignition SCR 26 is rendered conductive. The first spark retard circuit means 30 preferably further includes unilateral current flow means, preferably in the form of a diode 54 connected between the anode 34 of SCR 32 and the RC delay network junction 46, to allow for discharge of the delay network capacitor 42 after SCR 32 is rendered conductive.

The system 10 also comprises second spark retard circuit means 56 connectable to the first spark retard circuit means 30 for further preventing discharge of charge capacitor 16 through primary coil 20 for a second predetermined period of time in addition to the first predetermined period of time after ignition SCR 26 is rendered conductive. The system 10 further comprises means 58 for connecting the second spark retard circuit means 56 to the first spark retard circuit means 30 when the engine is in neutral.

While various suitable second spark retard circuit means 56 can be employed, in the preferred embodiment, the second spark retard circuit means 56 includes a second RC delay network 60 connectable to SCR 32. The RC delay network 60 includes a capacitor 62 and a resistor 64 with a junction or line 66 therebetween. The network 60 has one end 68 connectable to SCR anode 34, and an opposite end 70 connectable to SCR cathode 36. The network junction 66 is connected to network junction 46 by line 71.

While various suitable means 58 can be used for connecting the second spark retard circuit means 56 for the first spark retard circuit means 30 when the engine is in neutral, in the illustrated construction, such means 58 includes switch means 72 (shown schematically) for connecting the end 68 of network 60 to the end 48 of network 40 when the engine is in neutral, and for simultaneously connecting the opposite end 70 of network 60 to the end 50 of network 40 when the engine is in neutral. In the preferred embodiment, the switch means 72 includes a switch 74 connected between the end 68 of network 60 and the end 48 of network 40, and between the end 70 of network 60 and the end 50 of network 40, and the connecting means 58 further includes means 76 for closing the switch 74 when the engine is in neutral.

In the preferred embodiment, the means 76 for closing the switch 74 includes a transmission shift lever 78 which is operably connected to the engine transmission 80 (shown schematically) for shifting the transmission 80 between forward, neutral, and reverse. The switch 74 includes an actuator 82 which is normally biased outwardly of the switch 74, so that the switch 74 is open. When the actuator 82 is pushed inwardly, the switch 74 is closed. The switch 74 is positioned adjacent the shift lever 78 so that the actuator 82 is pushed inwardly when the shift lever 78 is in neutral. Therefore, the switch 74 is closed when the engine is in neutral. A similar switching arrangement is disclosed in U.S. Donohue Patent Application Ser. No. 635,172, filed July 27, 1984, which discloses mechanical means for retarding spark timing in neutral.

In describing the operation of the CD ignition system 10, it will be assumed that charge capacitor 16 is fully charged and that a trigger signal produced by trigger coil 28 is applied to the gate of ignition SCR 26. It will also be assumed, to begin with, that the engine is not in neutral. When ignition SCR 26 is rendered conductive by the charge applied to the gate, current flows from charge capacitor 16 through primary coil 20, through ignition SCR 26, and through resistor 44 to capacitor 42 of the first RC delay network 40. A predetermined period of time later, when the voltage on capacitor 42 reaches the breakover potential of zener diode 52, that voltage is applied to the gate 38 of SCR 32 so as to render SCR 32 conductive. The circuit is then completed and the charge voltage on charge capacitor 16 is fully impressed across primary ignition coil 20 so that the spark plug 24 fires. The predetermined delay of the RC delay network 40, i.e., the first predetermined period of time, is the amount of time the spark is retarded.

When the engine is shifted to neutral, the switch 74 is closed and the second spark retard circuit means 56 is connected to the first spark retard circuit means 30. When ignition SCR 26 is rendered conductive, current flows from charge capacitor 16 through primary ignition coil 20, through SCR 32, through resistor 44 and capacitor 42 of the first RC delay network 40, and through resistor 64 and capacitor 62 of the second RC delay network 60. Because the RC delay networks 40 and 60 are connected in parallel, the second RC delay network 60 increases by the second predetermined period of time the time it takes for a voltage to build up on capacitors 42 and 62 sufficient to break down zener diode 52 and trigger SCR 32. When SCR 32 is triggered, the circuit is closed and the charge voltage on charge capacitor 16 is fully impressed across primary ignition coil 20 so that the spark plug 24 fires. Thus, the predetermined delay of the two RC delay networks 40 and 60, the second predetermined period of time in addition to the first predetermined period of time, is the amount of time the spark is retarded.

The system 10 also functions as an idle governor. As can be readily appreciated by those skilled in the art, delay of charge capacitor discharge for a constant predetermined period of time results in increasing spark retard as engine speed increases. Thus, when the engine is idling, an increase in engine speed retards the spark timing, thereby lowering the power output of the engine and lowering the engine speed or rpm. If the engine speed decreases, the spark timing advances, thereby increasing the power output of the engine and increasing the engine speed or rpm.

Illustrated in FIG. 2 is an alternative embodiment of the invention. The circuit 100 illustrated in FIG. 2 is substantially identical to the circuit illustrated in FIG. 1 (the same reference numerals are used), except that the circuit 100 illustrated in FIG. 2 further comprises means 102 connected to SCR gate 38 in parallel with the voltage threshold means or zener diode 52 and responsive to engine speed for applying a trigger voltage to SCR gate 38 to render conductive SCR 32 so as to advance the spark timing at a predetermined engine speed. In the illustrated construction, the means 102 for applying a trigger voltage to SCR gate 38 includes an integrated circuit IC connected to the power source 12 and to SCR gate 38 in parallel with the zener diode 52. The integrated circuit is preferably a frequency to voltage converter and is responsive to pulses representative of engine speed for applying a trigger voltage to SCR gate 38 to render conductive SCR 32. In other words, the integrated circuit senses preselected engine speeds and supplies a trigger voltage to SCR gate 38 to render conductive SCR 32 and bypass the RC delay networks 40 and 60 so as to advance the spark timing. This allows, for example, advancement of the spark timing at midrange engine speeds.

A similar integrated circuit arrangement is disclosed in the above mentioned Anderson U.S. Pat. No. 4,480,624.

Various other features and advantages of the invention are set forth in the following claims.

I claim:

1. A capacitor discharge ignition circuit adapted for use with an internal combustion engine, said circuit comprising a charge capacitor, a primary ignition coil, an ignition SCR, first spark retard circuit means in series with said charge capacitor, said ignition SCR, and said primary coil and operative for selectively preventing discharge of said capacitor through said primary coil for a first predetermined period of time after said ignition SCR is rendered conductive, thereby providing for automatic spark retard at higher engine rpm, second spark retard circuit means connectable to said first spark retard circuit means for further preventing discharge of said capacitor through said primary coil for a second predetermined period of time in addition to said first predetermined period of time after said ignition SCR is rendered conductive, and means for connecting said second spark retard circuit means to said first spark retard circuit means when said engine is in neutral.

2. A capacitor discharge ignition circuit in accordance with claim 1 wherein said first spark retard circuit means includes a second SCR connected in series with said charge capacitor, said primary coil, and said ignition SCR, and delay means for preventing said second SCR from being rendered conductive for said first predetermined period of time after said ignition SCR is rendered conductive.

3. A capacitor discharge ignition circuit in accordance with claim 2 wherein said second SCR has a gate, an anode, and a cathode, and wherein said delay means includes an RC delay network including a capacitor and a resistor with a junction therebetween, said network having one end connected to said second SCR anode and an opposite end connected to said second SCR cathode, said delay means also including voltage threshold means connected between said second SCR gate and said RC delay network junction for preventing said second SCR from being rendered conductive for said first predetermined period of time after said ignition SCR is rendered conductive.

4. A capacitor discharge ignition circuit in accordance with claim 3 wherein said voltage threshold means comprises a zener diode having an anode connected to said second SCR gate, and a cathode connected to said RC delay network junction.

5. A capacitor discharge ignition circuit in accordance with claim 3 wherein said delay means further includes unilateral current flow means connected between said second SCR anode and said RC delay network junction to allow for discharge of said delay network capacitor through said unilateral current flow means when said second SCR is rendered conductive.

6. A capacitor discharge ignition circuit in accordance with claim 5 wherein said unilateral current flow means comprises a diode having an anode connected to said RC delay network junction, and a cathode connected to said second SCR anode.

7. A capacitor discharge ignition circuit in accordance with claim 2 wherein said second spark retard circuit means includes a second RC delay network connectable to said second SCR for further preventing said second SCR from being rendered conductive for said second predetermined period of time in addition to said first predetermined period of time after said ignition SCR is rendered conductive.

8. A capacitor discharge ignition circuit in accordance with claim 7 wherein said second RC delay network includes a capacitor and a resistor with a junction therebetween, said second network having one end connectable to said second SCR anode and an opposite end connectable to said second SCR cathode, and said second network junction being connected to said first network junction.

9. A capacitor discharge ignition circuit in accordance with claim 8 wherein said connecting means includes switch means for connecting said one end of said second network to said second SCR anode when said engine is in netural, and for simultaneously connecting said opposite end of said second network to said second SCR cathode when said engine is in neutral.

10. A capacitor discharge ignition circuit in accordance with claim 9 wherein said switch means includes a switch connected between said one end of said second network and said second SCR anode, and between said opposite end of said second network and said second SCR cathode, and wherein said connecting means further includes means for closing said switch when said engine is in neutral.

11. A capacitor discharge ignition circuit adapted for use with an internal combustion engine, said circuit comprising a charge capacitor, a primary ignition coil, an ignition SCR, first spark retard circuit means including a second SCR connected in series with said charge capacitor, said primary coil, and said ignition SCR, said second SCR having a gate, an anode, and a cathode, an RC delay network including a capacitor and a resistor with a junction therebetween, said network having one end connected to said second SCR anode and an opposite end connected to said second SCR cathode, and voltage threshold means connected between said second SCR gate and said RC delay network junction for preventing said second SCR from being rendered conductive for a first predetermined period of time after said ignition SCR is rendered conductive, means connected to said second SCR gate in parallel with said voltage threshold means and responsive to engine speed for applying a trigger voltage to said second SCR gate to render conductive said second SCR so as to advance the spark timing at a predetermined engine speed, second spark retard circuit means connectable to said first spark retard circuit means for further preventing said second SCR from being rendered conductive for a second predetermined period of time in addition to said first predetermined period of time after said ignition SCR is rendered conductive, and means for connecting said second spark retard circuit means to said first spark retard circuit means when said engine is in neutral.

12. A capacitor discharge ignition circuit in accordance with claim 11 wherein said circuit further comprises means for charging said charge capacitor, and wherein said means for applying a trigger voltage to said second SCR gate includes a frequency to voltage converter connected to said second SCR gate in parallel with said voltage threshold means, connected to said means for charging said charge capacitor, and responsive to pulses representative of engine speed for applying a trigger voltage to said second SCR gate to render conductive said second SCR at said predetermined engine speed, thereby bypassing said RC delay network so as to advance the spark timing.

13. A capacitor discharge ignition circuit in accordance with claim 11 wherein said voltage threshold means comprises a zener diode having an anode connected to said second SCR gate, and a cathode connected to said RC delay network junction.

14. A capacitor discharge ignition circuit in accordance with claim 11 wherein said first spark retard circuit means further includes unilateral current flow means connected between said second SCR anode and said RC delay network junction to allow for discharge of said delay network capacitor through said unilateral current flow means when said second SCR is rendered conductive.

15. A capacitor discharge ignition circuit in accordance with claim 14 wherein said unilateral current flow means comprises a diode having an anode connected to said RC delay network junction, and a cathode connected to said second SCR anode.

16. A capacitor discharge ignition circuit in accordance with claim 11 wherein said second spark retard circuit means includes a second RC delay network connectable in parallel with said first mentioned RC delay network for further preventing said second SCR from being rendered conductive for said second predetermined period of time in addition to said first predetermined period of time after said ignition SCR is rendered conductive.

17. A capacitor discharge ignition circuit in accordance with claim 16 wherein said second RC delay network includes a capacitor and a resistor with a junction therebetween, said second network having one end connectable to said second SCR anode and an opposite end connectable to said second SCR cathode, and said second network junction being connected to said first network junction.

18. A capacitor discharge ignition circuit in accordance with claim 17 wherein said connecting means includes switch means for connecting said one end of said second network to said second SCR anode when said engine is in neutral, and for simultaneously connecting said opposite end of said second network to said second SCR cathode when said engine is in neutral.

19. A capacitor discharge ignition circuit in accordance with claim 18 wherein said switch means includes a switch connected between said one end of said second network and said second SCR anode, and connected between said opposite end of said second network and said second SCR cathode, and wherein said connecting means further includes means for closing said switch when said engine is in neutral.

20. A capacitor discharge ignition circuit adapted for use with an internal combustion engine, said circuit comprising a charge capacitor, a primary ignition coil, an ignition SCR, a second SCR connected in series with said charge capacitor, said primary coil, and said ignition SCR, said second SCR having a gate, an anode, and a cathode, a first RC delay network including a capacitor and a resistor with a junction therebetween, said first network having one end connected to said second SCR anode and an opposite end connected to said second SCR cathode, voltage threshold means connected between said second SCR gate and said first RC delay network junction for preventing said second SCR from being rendered conductive for a first predetermined period of time after said ignition SCR is rendered conductive, a second RC delay network for further preventing said second SCR from being rendered conductive for a second predetermined period of time in addition to said first predetermined period of time after said ignition SCR is rendered conductive, said second RC delay network including a capacitor and a resistor with a junction therebetween, said second network having one end connectable to said second SCR anode and an opposite end connectable to said second SCR cathode, and said second network junction being connected to said first network junction, and switch means for connecting said one end of said second network to said second SCR anode when said engine is in neutral, and for simultaneously connecting said opposite end of said second network to said second SCR cathode when said engine is in neutral.

21. A capacitor discharge ignition circuit in accordance with claim 20 and further comprising means connected to said second SCR gate in parallel with said voltage threshold means and responsive to engine speed for applying a trigger voltage to said second SCR gate to render conductive said second SCR so as to advance the spark timing at a predetermined engine speed.

22. A capacitor discharge ignition circuit in accordance with claim 21 wherein said circuit further comprises means for charging said charge capacitor, and wherein said means for applying a trigger voltage to said second SCR gate includes a frequency to voltage converter connected to said second SCR gate in parallel with said voltage threshold means, connected to said means for charging said charge capacitor, and responsive to pulses representative of engine speed for applying a trigger voltage to said second SCR gate to render conductive said second SCR at said predetermined engine speed, thereby bypassing said first and second RC delay networks so as to advance the spark timing.

23. A capacitor discharge ignition circuit in accordance with claim 22 wherein said switch means includes a switch connected between said one end of said second network and said second SCR anode, and connected between said opposite end of said second network and said second SCR cathode, and wherein said connecting means further includes means for closing said switch when said engine is in neutral.

24. A capacitor discharge ignition circuit in accordance with claim 23 wherein said voltage threshold means comprises a zener diode having an anode connected to said second SCR gate, and a cathode connected to said RC delay network junction.

25. A capacitor discharge ignition circuit in accordance with claim 24 and further including a diode having an anode connected to said first RC delay network junction, and a cathode connected to said second SCR anode, said diode allowing for discharge of said first and second delay network capacitors when said second SCR is rendered conductive.

* * * * *